US011165954B1

(12) United States Patent
Beach et al.

(10) Patent No.: US 11,165,954 B1
(45) Date of Patent: Nov. 2, 2021

(54) SCENE-AWARE CUSTOM TUNED VIDEO SURVEILLANCE DETECTION SYSTEM

(71) Applicant: ObjectVideo Labs, LLC, Tysons, VA (US)

(72) Inventors: Allison Beach, Leesburg, VA (US); Donald Gerard Madden, Columbia, MD (US); Narayanan Ramanathan, Chantilly, VA (US)

(73) Assignee: Objectvideo Labs, LLC, Tysons, VA (US)

( * ) Notice: Subject to any disclaimer, the term of this patent is extended or adjusted under 35 U.S.C. 154(b) by 0 days.

(21) Appl. No.: 16/893,991

(22) Filed: Jun. 5, 2020

Related U.S. Application Data

(60) Provisional application No. 62/863,341, filed on Jun. 19, 2019.

(51) Int. Cl.
| | |
|---|---|
| *H04N 5/232* | (2006.01) |
| *H04N 7/18* | (2006.01) |
| *G06K 9/62* | (2006.01) |
| *G06N 3/08* | (2006.01) |
| *G06K 9/00* | (2006.01) |
| *G06N 3/04* | (2006.01) |

(52) U.S. Cl.
CPC ..... *H04N 5/23225* (2013.01); *G06K 9/00771* (2013.01); *G06K 9/6256* (2013.01); *G06N 3/08* (2013.01); *H04N 7/183* (2013.01); *G06N 3/04* (2013.01)

(58) Field of Classification Search
CPC ...... H04N 5/23225; H04N 7/183; G06N 3/08; G06N 3/04; G06K 9/00771; G06K 9/6256
See application file for complete search history.

(56) References Cited

U.S. PATENT DOCUMENTS

| | | | |
|---|---|---|---|
| 9,530,221 B2 | 12/2016 | Zhu et al. | |
| 9,916,493 B2 * | 3/2018 | Begeja | G06K 9/00288 |
| 10,121,104 B1 * | 11/2018 | Hu | G06N 3/08 |
| 10,769,448 B2 * | 9/2020 | Shinohara | H04N 5/23203 |
| 10,785,419 B2 * | 9/2020 | Wang | G06T 5/002 |
| 10,798,293 B2 * | 10/2020 | Sudo | G02B 7/36 |
| 10,930,037 B2 * | 2/2021 | Namiki | G06T 11/60 |
| 11,042,155 B2 * | 6/2021 | Zheng | G06N 5/02 |
| 2006/0078047 A1 * | 4/2006 | Shu | H04N 21/2187 |
| | | | 375/240.01 |

(Continued)

OTHER PUBLICATIONS

Xu et al., "Background modeling methods in video analysis: A review and comparative evaluation," CAAI Transactions on Intelligence Technology, Jan. 1, 2016, 1(1):43-60.

*Primary Examiner* — Boubacar Abdou Tchoussou
(74) *Attorney, Agent, or Firm* — Fish & Richardson P.C.

(57) ABSTRACT

Methods, and systems including computer programs encoded on a computer storage medium, for training a detection model for surveillance devices using semi-supervised learning. In one aspect, the methods include receiving imaging data collected by a camera of a scene within a field of view of the camera. Annotated training data is generated from the imaging data and one or more detection models are trained using the annotated training data. Based on a set of performance parameters, an optimized detection model is selected of the one or more detection models, and the optimized detection model is provided to the camera.

18 Claims, 5 Drawing Sheets

(56) References Cited

U.S. PATENT DOCUMENTS

| | | | |
|---|---|---|---|
| 2007/0223596 A1* | 9/2007 | Fan | H04N 5/144 375/240.29 |
| 2015/0324686 A1* | 11/2015 | Julian | G06N 3/08 706/25 |
| 2016/0048741 A1* | 2/2016 | Nguyen | G06K 9/00624 382/159 |
| 2016/0284095 A1* | 9/2016 | Chalom | G06K 9/627 |
| 2016/0292512 A1* | 10/2016 | Kanna | G06K 9/6215 |
| 2017/0236013 A1* | 8/2017 | Clayton | G06K 9/00221 382/104 |
| 2017/0310881 A1* | 10/2017 | Sevin | G08B 13/196 |
| 2018/0091778 A1* | 3/2018 | Chen | G06F 9/45558 |
| 2018/0349709 A1* | 12/2018 | Shinohara | H04N 5/23203 |
| 2018/0349785 A1* | 12/2018 | Zheng | G05D 1/0287 |
| 2019/0065901 A1* | 2/2019 | Amato | G06N 3/04 |
| 2019/0171897 A1* | 6/2019 | Merai | G06K 9/6267 |
| 2019/0260924 A1* | 8/2019 | Sudo | H04N 5/23245 |
| 2020/0082262 A1* | 3/2020 | Liu | G06N 3/0454 |
| 2020/0184215 A1* | 6/2020 | Xu | H04N 5/232935 |
| 2020/0244861 A1* | 7/2020 | Wang | H04N 5/2351 |
| 2020/0302168 A1* | 9/2020 | Vo | G06K 9/6217 |
| 2020/0356812 A1* | 11/2020 | Oleynik | G06K 9/209 |
| 2020/0374446 A1* | 11/2020 | Wang | G06T 5/002 |
| 2020/0380266 A1* | 12/2020 | Nadathur | H04N 21/23476 |
| 2020/0382697 A1* | 12/2020 | Nagao | H04N 5/23245 |
| 2021/0089841 A1* | 3/2021 | Mithun | G06K 9/4604 |
| 2021/0173707 A1* | 6/2021 | Kou | G06N 3/08 |
| 2021/0192772 A1* | 6/2021 | Tate | G06K 9/00362 |
| 2021/0225511 A1* | 7/2021 | Kiraly | G06K 9/46 |

* cited by examiner

SCENE-AWARE CUSTOM TUNED VIDEO SURVEILLANCE DETECTION SYSTEM

CROSS-REFERENCE TO RELATED APPLICATIONS

This application claims the benefit of U.S. Application 62/863,341, filed on Jun. 19, 2019, the contents of which are incorporated by reference.

TECHNICAL FIELD

This disclosure relates generally to training a detection model for surveillance devices using semi-supervised learning.

BACKGROUND

For a residential-based commercial intelligent surveillance system solution, detecting vehicles, animals, or people and having the ability to differentiate quickly between them is valuable for preventing unnecessary alerts and/or incurring costs associated with false alarms.

SUMMARY

Techniques are described for training an optimized detection model to generate a custom-fit surveillance solution for a surveillance camera in a home monitoring system. A detection model optimization system can receive imaging data from a surveillance camera, form an understanding of the scenes, subjects, objects of interest, and events in the imaging data, and generate a set of detection models that are site-specific to the surveillance camera. An optimized detection model can be selected from the set of detection models using one or more performance parameters for the surveillance camera, e.g., precision vs. recall specifications, cost-analysis, user-preferences, or the like.

In general, one innovative aspect of the subject matter described in this specification can be embodied in methods that include the actions of receiving, from a camera, imaging data collected by the camera of a scene within a field of view of the camera, generating, from the imaging data, annotated training data, training one or more detection models using the annotated training data, selecting, based on a set of performance parameters, an optimized detection model of the one or more detection models, and providing, to the camera, the optimized detection model. Other embodiments of this aspect include corresponding systems, apparatus, and computer programs, configured to perform the actions of the methods, encoded on computer storage devices.

These and other embodiments can each optionally include one or more of the following features. In some implementations, annotated training data includes one or more of subject data, event data, or scene awareness data. Scene awareness data can include identified exclusion zones within the scene including scene entities known to be sources of spurious motion. Subject data can include identified objects/humans present in the imaging data collected by the camera of the scene. Event data can include identified locations and/or sub-areas of the scene in which events occur, and where identifying locations and/or sub-areas of the scene in which events occur comprises utilizing pattern recognition and clustering to analyze and extract event information from the imaging data.

In some implementations, each performance parameter of the set of performance parameters utilized to select the optimized detection model is weighted with respect to each other performance parameter based on scene awareness, subject awareness, and event awareness. The weights of each performance parameter in the set of performance parameters can depend on a first threshold of precision and a second threshold of recall for the one or more detection models.

In some implementations, selecting the optimized detection model of the one or more detection models based on the set of performance parameters includes: determining, from the imaging data captured by the camera of the scene, scene/object combinations observed in the scene, determining, based on the scene/object combinations, a severity rating for the scene, and selecting a first value for the first threshold of precision and a second value for the second threshold of recall, the first value and second value selected depending on the severity rating for the scene. The severity rating for the scene can depend on risk factors associated with the scene/object combinations present in the scene for the camera.

In some implementations, selecting the optimized detection model of the one or more detection models based on the set of performance parameters includes determining a first degree of complexity of the scene based on a frequency of perturbations, and selecting a particular detection model of the one or more detection models based on a second degree of complexity of the particular detection model matching the first degree of complexity.

In some implementations, two or more detection models are provided to the camera, each detection model of the two or more detection models optimized for a respective particular sub-scene of the scene, wherein each sub-scene is identified utilizing scene segmentation.

In some implementations, training one or more detection models includes utilizing a convoluted neural network to train a plurality of detection models using the annotated training data.

In some implementations, generating annotated training data includes utilizing one or more neural networks to annotate the imaging data to extract information about the scene within the field of view of the camera and information related to subjects and events that are detected within the scene. A deep-learning classifier can be utilized to differentiate between positive detections and negative detections to train a classifier what is and is not interesting in the scene.

Implementations of the described techniques may include hardware, a method or process implemented at least partially in hardware, or a non-transitory computer-readable storage medium encoded with executable instructions that, when executed by a processor, perform operations.

The techniques described in this disclosure provide one or more of the following advantages. Training an optimized site-specific detection model for a surveillance device (e.g., a camera), can reduce costs of operating the surveillance device while maintaining a desired performance level of the surveillance solution. Awareness of scenes, objects, subjects, and events for a particular surveillance device can be utilized to generate training data to train detection models that are lightweight and require less processing power from cloud-based servers. A simpler, leaner, deep-learning model can be deployed either locally on a camera or on a smaller graphical processing unit (GPU) card on the cloud that has reduced costs. Deep learning models derived from a particular scene of interest can be less prone to erroneous object detection and can have improved response times for the particular scene of interest over generic models. Surveillance providers (e.g., security companies) can experience a lower support burden and can improve the surveillance provider's ability to provide a custom-fit solution for a customer, which can result in improved customer satisfaction and loyalty. Customers utilizing the site-specific detection model can have a better overall user experience with analytics that cater to a user's personal priorities.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Techniques are described for a detection model optimization system that trains and tests different site-specific detection models with different performance parameters, and selects a particular detection model that is optimized for a particular set of performance parameters.

Figure 1:
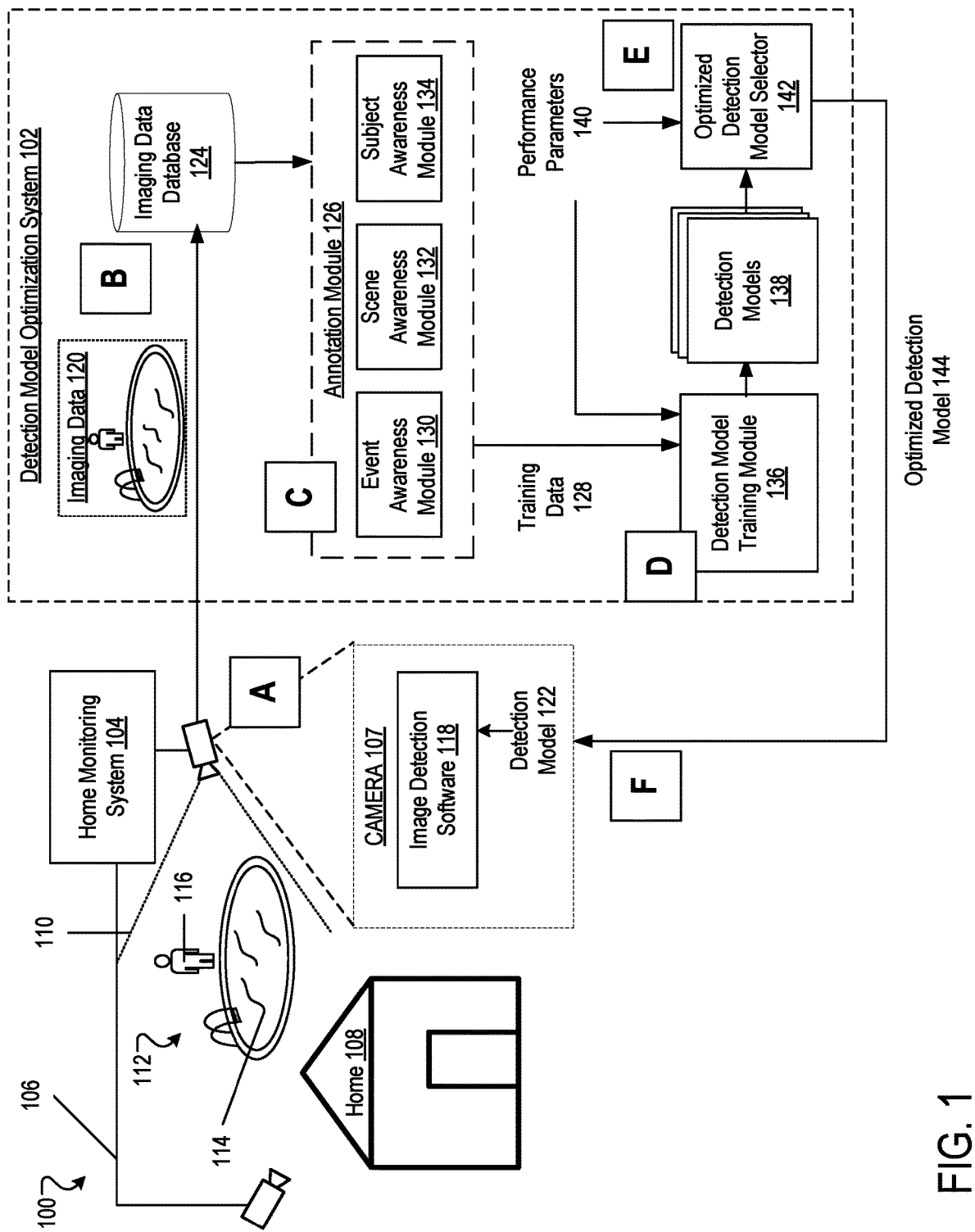
FIG. 1 is a block diagram of an example operating environment for a detection model optimization system.

FIG. 1 is a block diagram of an example operating environment 100 for a detection model optimization system 102. A home monitoring system 104 can include a set of surveillance devices 106 located in or surrounding the home 108, including, for example, cameras, motion detectors, window/door sensors, and keypad access door locks. The surveillance devices 106 may be installed indoors or outdoors, and can each have a field of view of a particular area of home 108. As depicted in the example operating environment 100 of FIG. 1, a surveillance device 106 is a camera 107 (e.g., surveillance camera, night-vision camera, infrared camera, or the like) that captures video or still images of an area of the home 108 or is a motion detector that senses movement in a region of the home 108.

Home 108 can be, for example a residence (e.g., a single-family home, a town house, a condominium, or an apartment). In some implementations, a home 108 can be a commercial property (e.g., a business, government building, or a public space). In some implementations, the home monitoring system 104, the detection model optimization system 102, or a combination of the two systems can be hosted on one or more servers. Though described here as a home monitoring system 104 and a detection model optimization system 102, the functions described of each system can be implemented instead on more or fewer systems. In some implementations, the detection model optimization system 102 is a sub-system of the home monitoring system 104.

In stage A, imaging data 120 is captured of a scene 112 within the field of view 110 of the camera 107. In some implementations, camera 107 may record the environment within its respective field of view 110 continuously and may capture a scene 112. A scene 112 can include non-moving entities, e.g., a road, driveway, trees, foliage, shrubs, door, lamp-post, sky, house, etc. The scene 112 can include moving entities, e.g., particular zones of the scene 112 can be susceptible to spurious motion alerts, e.g., movement from a person, animal, vehicle, tree branches, etc., that occur within the scene 112. For example, as depicted in FIG. 1, scene 112 includes a swimming pool 114 and a person 116.

In some implementations, camera 107 may record discontinuously and include one or more triggers (e.g., a movement trigger, sound trigger, and change in lighting trigger) for activating a recorded video and/or image. For example, a motion sensor may detect motion in the scene 112 within the field of view 110 of the camera 107, e.g., a person 116 walking in front of the pool 114, and trigger capturing the environment in an image or video clip. In another example, camera 107 may automatically capture scheduled bursts of video and/or images within the field of view of the surveillance device 106 (e.g., every 10 seconds, every 60 seconds, every 5 minutes, or the like).

Camera 107 can include image detection software 118 to capture and detect potential perturbations in the scene 112 within the field of view 110 of the camera 107. Imaging data 120 can be processed by the image detection software 118 and objects, people, and events can be classified as a generic class of object of interest, e.g., a "vehicle," a "human," an "animal," or the like.

In some implementations, a generic detection model 122 can be provided to the camera 107, where the camera 107 collects imaging data when an object, person, or event is determined to perturb the scene 112 within the field of view 110 of the camera 107. In some implementations, the image detection software 118 can include a generic detection model 122 that is provided to the camera 107 when the camera is installed.

In stage B, the imaging data 120 is provided to the detection model optimization system 102 over a network, for an imaging data database 124. Imaging data database 124 can include imaging data 120 collected by the camera 107 over a period of time, e.g., a week, a few days, a month, etc., and can be representative of various imaging conditions, e.g., different inclement weather, lighting conditions, etc. Imaging data database 124 can include imaging data 120 collected during various different events, e.g., a storm, sunrise, etc., of various different subjects, e.g., a homeowner, a visitor, a postal employee, and of various different objects, e.g., a backpack, a vehicle, etc.

In stage C, an annotation module 126 analyzes the imaging data to extract information about the scene 112 captured within the field of view 110 of the camera 107, and information related to the subjects and events that are detected within the scene 112. The annotation module 126 can receive imaging data 120 including multiple images and/or video clips of the scene 112 that are captured over a period of time and generate, from the imaging data 120, multiple annotated training datasets for the multiple images and/or video clips.

In some implementations, the annotation module 126 uses a deep-learning classifier to differentiate between positive detections (e.g., object motion) and false positive detections (e.g., due to scene disturbance motion) to train a classifier what is and is not interesting in a particular scene 112. The annotation module 126 can use a neural network cloud-based detection model to analyze imaging data 120 provided by the camera 107 and determine a set of positive detections for the particular scene 112. The training data 128 generated by the annotation module can be site-specific to the particular scene 112, thereby generating highly-specific training data 128 for the particular scene 112 within the field of view 110 of the camera 107.

The annotation module 126 can include an event awareness module 130, a scene awareness module 132, and a subject awareness module 134. Though described here as an event awareness module 130, a scene awareness module 132, and a subject awareness module 134, the functions described can be performed by more or fewer modules.

The scene awareness module 132 runs scene-understanding algorithms to label the non-moving entities of the scene 112, e.g., a road, driveway, trees, foliage, shrubs, door, lamp-post, sky, house, etc. Next the annotation module determines how susceptible the scene is towards spurious motion alerts, e.g., false detections caused by the scene. The determination of susceptibility can be made based on the scene entities and scene conditions that are included in the scene. Scene entities are the sub-areas or sub-scenes that compose the scene 112 (e.g., a fence area, a driveway area, a tree area, etc.) Scene conditions are operating conditions that can affect the camera performance including inclement weather (e.g., wind, rain, snow, etc.), lighting conditions (e.g., day vs night, glare from direct sunlight, shadows at particular times of day, etc.), or seasonal variations.

In some implementations, relationships between particular scene conditions and particular scene entities can be determined. For example, weather conditions can directly impact the behavior of a tree in the scene, e.g., cause the branches to move around or leaves to fall from the tree. In another example, lighting conditions can cause glare to reflect off a window in the scene into the field of view of the camera.

In some implementations, the scene awareness module 132 identifies exclusion zones that are areas of the scene 112 which include scene entities known to be sources of spurious motion (e.g., false detections). Exclusion zones can be established for a scene 112 where a detection model for the scene is trained to ignore the spurious motion within the exclusion zone.

In some implementations, scene segmentation and scene labeling on imaging data (e.g., video frames) can be performed on imaging data 120 that is collected from different times of day and under different conditions. A consensus is identified from the different scene labels and sub-scenes. For example, a scene can include 40% driveway, 10% sidewalk, 20% lawn, 10% road, 10% trees, and 10% sky. The scene-awareness module can identify similar scenes in pre-generated training sets, e.g., collected from multiple different locations each with a similar scene over time, and include the annotated data from the similar scenes with the training data 128 to provide to the detection model training module 136.

In some implementations, the scene-awareness module generates a size-map of the scene 112, such that objects (e.g., humans, vehicles) appearing in the scene 112 can be assigned estimated sizes (e.g., a number of pixels in height/width) for a particular zone of the scene. In one example, a human height can be defined as a number of pixels between a foot location and a head location of the human and a human width can be defined as a number of pixels between the left shoulder and right shoulder, e.g., a human appearing at the foreground of a particular scene 112 can be defined by (X1, Y1), (X2, Y2), or (X,Y), (X+width, Y+height) at the background of the particular scene 112. In another example, a car height can be defined as a number of pixels between a tire location and a top of the roof of the car and a width as a number of pixels between a left tire and a right tire. Based on the generated size-map, objects that are outside estimated ranges of size can be filtered out of the scene as unimportant.

In some implementations, a scene can be divided into a set of grids where a person detected in the scene can be identified as having a foot location within one of the set of grids. An associated width and height for the person is expected to be within one or two standard deviations of a pre-determined size for the particular grid, and otherwise can be ignored as unimportant.

In some implementations, multiple size-maps of the scene 112 can be generated, for example, one size-map for adult humans and one size-map for child humans. Each size-map would estimate sizes of the respective humans in different zones of the scene. In another example, different size maps can be generated for different vehicles that appear in the scene, e.g., motorcycles and trucks. In instances where the system observes a high variability of person-sizes, animal-sizes, or vehicle-sizes for a given scene, additional imaging data can be collected from the scene to generate the multiple size-maps and further refine the training data 128 that is provided to the detection model training module 136.

In some implementations, size maps can be generated to describe the proximity of objects to each other or to the camera. For example, size maps can be used to recognize a tree, a patch of lawn, a sidewalk, and a driveway visible in the field of view of the camera and then determine that the camera is imaging a front yard of a home. The multiple size maps can be used to determine relative sizes of the yard, e.g., a length of the driveway or distance to the trees from the home, which can be useful for the analytics of the scene. The analytics can then distinguish between a sidewalk that is leading up to a front porch of the home which can trigger alerts, or a sidewalk that is a public path along the front of a series of townhomes which may not trigger alerts.

A subject awareness module 134 of the annotation module 126 can utilize object detection algorithms, facial recognition software, object clustering algorithms, and the like to recognize and identify the objects/humans that are present in the imaging data 120 collected by the camera 107 of the scene 112. Subjects present in the scene 112 are identified as familiar, e.g., a pattern of recognition is determined for subjects that are identified in the scene 112, and are annotated as "familiar." Subjects that meet a threshold of familiarity are annotated by the subject awareness module 134 as "familiar" while subjects that do not meet a threshold familiarity are annotated as "unfamiliar" A threshold of familiarity can be established by identifying the subject in the imaging data 120 a threshold number of times (e.g., five times), and/or by identifying the subject in the imaging data 120 a threshold number of times within a period of time (e.g., twice within a week). A threshold of familiarity can be met by a user providing information to the detection model optimization system 102 identifying a subject as familiar.

An event awareness module 130 of the annotation module 126 can localize events that occur within the scene, e.g., identify a location or sub-area in the scene the events tend to occur. In some implementations, the event awareness module 130 can utilize pattern recognition and clustering techniques to analyze the imaging data 120 and extract event information from the imaging data 120. Events that occur at particular times of day, days of the week, or under particular operating conditions can be identified and annotated by the event awareness module 130. For example, a mail truck arriving each weekday between 11-11:30 AM can be annotated "mail truck delivery." In another example, a homeowner leaving the home at 7:45 AM each weekday morning can be annotated "Jane leaves for work." Additionally, events can be classified/clustered into types of events (e.g., person walking through the scene, vehicle driving into/out of the scene, a bird visiting a bird feeder, etc. In one example, imaging data identifying a particular car pulling into the driveway every weekday evening can be annotated to identify the car entering the driveway sub-scene and the pattern of events labeled as "homeowner returning home." The event awareness module 130 can annotate video clips of particular events and generate training data 128 of the particular events to provide to the detection model training module 136.

The annotation module 126 provides as output the training data 128 to the detection model training module 136. In stage D, the detection model training module 136 receives the training data 128 and generates a set of one or more detection models 138. Each detection model 138 of the set of detection models 138 can be optimized for a particular subset of performance parameters from the performance parameters 140.

In some implementations, multiple different detection models 138 can be trained for different scenarios, e.g., daylight, high-wind conditions, commuting hours, etc. One or more of pre-filters, post-filtering, trackers, object association algorithms, and image enhancement techniques can be used in combination with the multiple detection models 138 depending in part on the scenario. In some implementations, an analytics solution can be developed for a particular scenario where the analytics solution includes one or more detection models 138 and additionally one or more additional image processing algorithms and/or techniques.

The detection model training module 136 can train multiple detection models 138 using the training data 128 where each of the multiple detection models 138 can be optimized for a different weighted set of performance parameters 140.

In some implementations, convoluted neural networks (CNN) can be used to train the multiple different detection models 138, where each CNN-trained model includes different computational layers such as convolutional layers, inception modules, residual network (ResNet) modules, and the like. Each layer is parameterized for size, depth, and a number of filters that are included. Models can therefore be trained in many different fashions using various combinations of the different computational layers.

Each performance parameter 140 can be weighted with respect to each other performance parameter based on the scene awareness, subject awareness, and event awareness determined by the detection model optimization system 102. Risk factors associated with the scene, subject, and events that are determined to be present in the scene for the particular camera 107 can determine weights of various sets of performance parameters 140 used in selecting the optimized detection model 144.

Performance parameters 140 are operating criteria for the particular camera 107 to achieve a particular operating goal, e.g., a relationship between system performance and a cost-optimal solution, where an accuracy threshold of the optimized detection model 144 is offset by a threshold cost of operating the camera 107. In one example, costs can be incurred (e.g., from emergency responders) for each false positive detection that is reported, creating a disincentive for reporting false positives, such that a particular detection model 138 having a higher weight for precision over recall may be selected as the optimized detection model 144. In another example, an optimized detection model 144 is one that has a highest degree of precision and recall with a lowest amount of event detection latency and a reduced cost of operation.

Factors for weighting the performance parameters 140 can include, for example, cost considerations for operating the home monitoring system 104. Performance parameters including precision (e.g., a proportion of accurate detections), recall (e.g., a proportion of events that are detected), cloud costs (e.g., costs incurred by processing imaging data in the annotation module and training object detection models), and costs incurred per false positive detects vs false negative detections can each have a different weight for a particular detection model 138.

More particularly, weighted performance parameters can include, for example, camera resolution settings, object detection latency settings, familiar object recognition settings, face detection and recognition latency settings, and notification delay settings.

In some implementations, performance parameters 140 can be provided by a user of the home monitoring system, e.g., a homeowner. For example, a user may be interested in reducing costs of operation of the surveillance devices. In another example, the user may prioritize a low number of false detections to prevent nuisance alerts, exceeding notification or recording limits, or unnecessarily incurring costs from emergency services. Performance parameters 140 for camera 107 can be generated from performance parameters used in similar scenes for other cameras, e.g., cameras associated with other home monitoring systems. For example, a camera 107 located at a business in a shopping center may have performance parameters that have been previously utilized in detection models for other cameras that are similarly located at other businesses in shopping centers.

In some implementations, performance parameters 140 can be selected for a camera 107 that is a part of a business monitoring surveillance solution. A different set of performance parameters 140 may be applied to a storage room versus on a shopping floor. In one example, a box located in a storage room can be a non-triggering event whereas a box held by an employee near an exit of the business may be a triggering event. In another example, a restaurant may expect customers to loiter at an entrance while waiting for a table but would not want employees to be loitering in the kitchen or back rooms of the restaurant.

In some implementations, camera resolution settings can define a resolution of operation, e.g., 1080p, where a higher resolution can result in higher quality imaging data as well as higher processing/computational costs for the higher quality imaging data. Camera resolution settings can be adjusted, e.g., lowered resolution, to fit a performance vs. cost model for the particular camera and scene.

In some implementations, object detection latency can define an amount of time for a particular detection model 138 to make an accurate assessment of an object in the field of view of the camera. Object detection latency for certain events can be automatically set by the system. For example, any event involving a toddler and a swimming pool can be set with a low detection latency.

In some implementations, object detection latency settings can include a threshold maximum amount of time that the detection model can operate before producing an accurate determination of an object in the scene. For example, an object detection latency can be defined as a relatively short amount of time (e.g., a few milliseconds) for an object of high value (e.g., a vehicle or a package on a front door step) and a relatively long amount of time (e.g., a few minutes) for an object of low value (e.g., a soccer ball on the front lawn).

Similarly, familiar object recognition settings and face detection and recognition latency setting can define thresholds of precision vs. recall for a particular detection model 138 to recognize a familiar object or subject. In some implementations, the settings can define a number of frames of imaging data and/or an amount of time required by the object detection model to recognize a familiar object or subject. For example, a face detection and recognition latency setting can be defined as a relatively short amount of time (e.g., a few milliseconds) for a familiar face of high value (e.g., a child living in the home 108) and a relatively long amount of time (e.g., a few minutes) for a familiar face of low value (e.g., the mail delivery person).

Notification delay settings can define a threshold amount of time for the system to determine to send a notification, e.g., an alert to a user's mobile device, including information about a detected object, person, event, etc. in the scene. The threshold amount of time can be selected, for example, based on a type of detection that has occurred, e.g., an unknown subject entering the field of view can trigger a lower threshold amount of time for the system to send a notification.

In stage E, the optimized detection model selector 142 selects an optimized detection model 144 from the detection models 138 for the current scene 112 of the camera 107 that corresponds to a particular subset of performance parameters 140 for the scene 112. The optimized detection model selector 142 can analyze the current scene 112 in the field of view 110 of the camera 107 and determine a weighted set of performance parameters 140 that are responsive to the current scene 112.

In some implementations, a particular detection model can be selected using scene/object combinations that are observed in the scene. Scene labels and typical associations of entities with the scene-labels from pre-defined datasets can be utilized to determine a respective severity rating for each scene/object combination that is observed in the scene. Scene/object combinations with low severity ratings can be assigned low recall, high precision performance parameters 140, whereas scene/object combinations with high severity ratings can be assigned high recall, low precision performance parameters 140. For example, a dog/front yard combination can have a high severity rating (e.g., the dog is loose in the front yard) vs. a mail delivery/mailbox combination can have a low severity rating.

In one example, as depicted in FIG. 1, the scene includes a swimming pool that is accessible by one or more family members of the home (e.g., a child). The detection model optimization system 102 can determine a subject in the scene is a child and an event of the child entering the swimming pool. The scene/object combination of "swimming pool/child" can have an associated high severity rating such that a detection model is selected that has high recall, relatively low precision, such that the particular detection model is less likely to miss detecting an individual (e.g., the child) that is close to the swimming pool.

In some implementations, a scene for a particular camera can be determined to have a high level of complexity, e.g., one that tends to generate a high frequency of false positives due to scene conditions (e.g., foliage, rolling headlights from cars driving on the street, rolling clouds, water fountains, fluttering flags, etc.). A scene with a high level of determined complexity may require a different set of weighted performance parameters for operation than a scene that is determined to have a low level of determined complexity.

In some implementations, performance parameters 140 for a camera 107 can change with temporary conditions that are affecting a camera's environment. Temporary conditions can include inclement weather, a spider web or other animal/ insect in close proximity to the camera, or the like. Performance parameters 140 can be weighted by a user's preferences including user-defined thresholds for cost, recall, and precision.

In some implementations, an optimized detection model 144 is selected for the available processing platform or available processing power. For example, a user may want to stay within a specific operating cost range or to run the detection model on a platform having a maximum operating limit (e.g., based on the model size and multiplier-accumulator units).

In Stage F, the optimized detection model 144 is provided to the camera 107. Camera 107 utilizes the optimized detection model 144 to detect subjects, events, and objects of interest. In some implementations, the detection model optimization system 102 determines using current imaging data 120 provided by the camera 107 that a scene 112 in the field of view 110 of the camera 107 has changed such that a different optimized detection model 144 is required.

In some implementations, an accuracy of the optimized detection model to detect events is tested. The system can collect imaging data over a span of several days/weeks and measure an effectiveness of the optimized detection model to detect events when compared to the cloud-based detection model. The system can identify sub-scenes where the optimized detection model may have been under-reporting or over-reporting events in comparison to the cloud-based model, and can prioritize processing band-width to the particular sub-scenes as a result in order to improve the accuracy of detection of events.

In some implementations, an accuracy of the optimized detection model to detect events is tested using user-provided feedback. For example, if a user repeatedly marks a particular type of event as a false detection, the system may learn from the feedback and re-train the optimized detection model 144.

Figure 2:
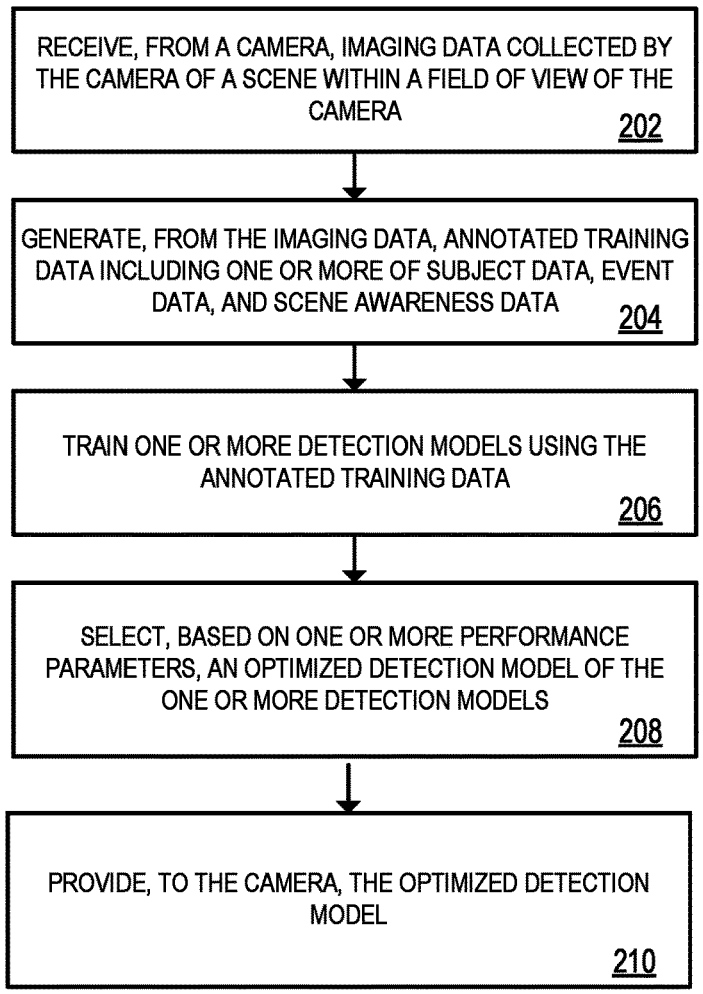
FIG. 2 is a flow diagram of an example process for generating an optimized detection model for a camera using the detection model optimization system.

FIG. 2 is a flow diagram of an example process 200 for providing an optimized detection model 144 for a camera 107 using the detection model optimization system 102.

The process 200 includes receiving imaging data collected by the camera of a scene within a field of view of the camera (202). For example, imaging data may be collected by the camera 107 of the scene 112 within the field of view 110 of the camera 107 that includes one or more scene entities (e.g., a driveway, a tree, a front door, etc.) which can be captured within the field of view 110 of the camera 107. The imaging data 120 is uploaded, e.g., over a network, to the detection model optimization system 102, where the system 102 can collect the imaging data 120 that is provided over a period of time (e.g., 4 days, 1 weeks, 2 weeks), in an imaging data database 124.

The process 200 includes generating annotated training data from the imaging data, including one or more of subject data, event data, and scene awareness data (204). For example, annotated training data 128 may be generated from the imaging data 120 by the annotation module 126 including one or more sub-modules, e.g., the event awareness module 130, the scene awareness module 132, and the subject awareness module 134. In the example, annotated training data generated from imaging data 120 collected from a camera 107 with a field of view of a driveway of a home can include labeled scene entities (e.g., "driveway," "front door," and the like), labeled subjects that appear in the imaging data (e.g., homeowner, mail delivery person, nanny, etc.), and labeled events that are observed in the imaging data (e.g., "homeowner leaves the house at 7 AM on weekdays," "child arrives home from school at 2:30 PM on weekdays," "housekeeper parks in driveway on Tuesdays and Thursdays", etc.). The annotated training data 128 is provided to the detection model training module 136.

The process 200 includes training one or more detection models using the annotated training data (206). For example, the detection model training module 136 may use the training data 128 to train one or more detection models 138, where each of the one or more detection models 138 is optimized for a particular set of performance parameters 140. The detection models 138 can have varying degrees of computational complexity, where a camera 107 that is observing a scene with high complexity (e.g., a playground setting) and with frequent perturbations, e.g., frequent appearance of objects in the scene, may require a detection model 138 with high complexity (e.g., high sensitivity to perturbations) while a camera 107 that is observing a scene with low complexity (e.g., a side wall of a building) and with infrequent perturbations may require a detection model 138 with low complexity (e.g., low sensitivity to perturbations). In one example, a view of a front yard including a high-traffic street with frequent perturbations, e.g., a large volume of detected events, may require a detection model with high complexity to distinguish between cars frequently driving by (objects not of interest) and a child playing in the front yard (object of interest). In another example, a view of a side of the house with infrequent perturbations, e.g., few detected events, may require a detection model with low complexity to merely distinguish between 'motion detected' and 'no motion detected.'

The process 200 includes selecting an optimized detection model of the one or more detection models, based on one or more performance parameters (208). For example, an optimized detection model 144 can be selected for a current scene of a camera (e.g., scene 112 of camera 107 in FIG. 1), e.g., to optimize cost of operation of the camera vs. performance criteria of the camera (e.g., precision vs. recall) for a current scene 112 of the camera 107. For example, the optimized detection model 144 for camera 107 can be a first detection model for sunny, clear weather and the optimized detection model 144 for camera 107 can be a second, different detection model for rainy, windy weather. In another example, an optimized detection model 144 can be a first detection model during weekdays and a second, different detection model during weekends. In another example, the optimized detection model 144 can be a first detection model when there are no people determined to be in the driveway of a home, and a second, different detection model when there are people determined to be present in the driveway of the home.

The process 200 includes providing the optimized detection model to the camera (210). For example, the optimized detection model 144 is provided to the camera 107 (e.g., over the network). In some implementations, multiple optimized detection models 144 can be provided to the camera 107, with instructions for when each optimized detection model 144 should be utilized by the camera 107. For example, a "clear weather" detection model and a "bad weather" detection model can both be provided to the camera 107 with instructions to switch between the two models depending on the weather conditions experienced by the environment of the camera 107. In another example, a "night time" detection model and a "day time" detection model can be provided to the camera with instructions to switch between the two detection models at particular times of day (e.g., sunset/sunrise) or when the camera 107 is switching between detection modes (e.g., a visible mode vs. an infrared mode). In another example, seasonal models can be optimized for a camera, for example, a "summer" model which handles the presence of insects, squirrels, and birds, a "fall" model which handles falling/blowing leaves, and a "winter" model which handles snowy/blizzard conditions. Each seasonal model can be optimized to handle the season-related exceptions (e.g., rain storms in spring, snow in winter).

The camera 107 can receive the optimized detection model 144 and proceed with utilizing the optimized detection model 144 to generate alerts for users of the home monitoring system 104. For example, a camera 107 viewing a scene including a front door can received an optimized detection model with high precision, low recall and a short dwell time for unfamiliar subjects that appear at the front door. The camera 107 can proceed to detect unfamiliar people that appear at the front door of the home and provide notifications to a user (e.g., homeowner) of the home monitoring system of the presence of a stranger at the front door.

Figure 3:
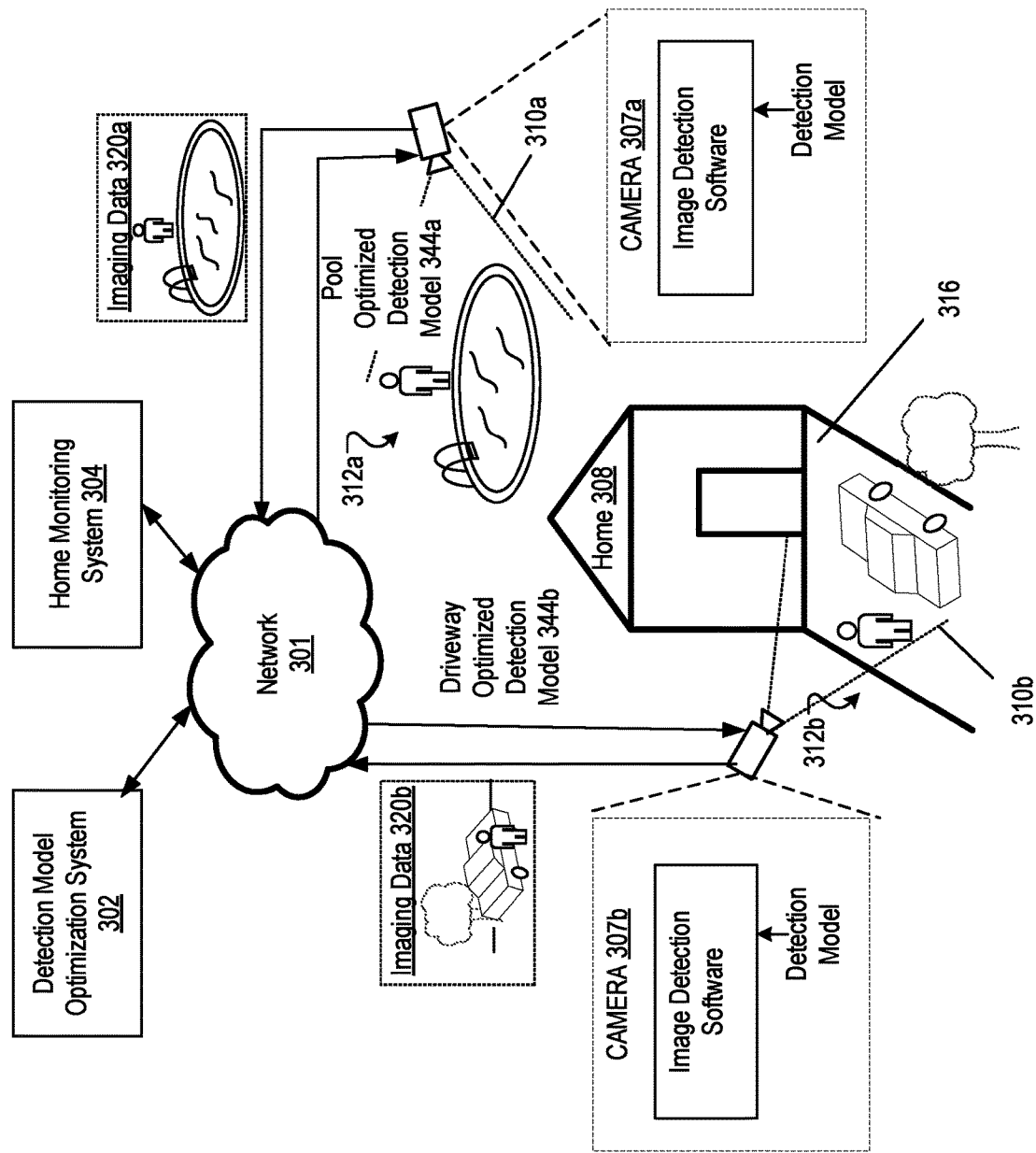
FIG. 3 is a block diagram of another example operating environment for a detection model optimization system.

FIG. 3 is a block diagram of another example operating environment 300 for a detection model optimization system 302. A home monitoring system 304 can include a set of surveillance devices 306 located in or surrounding the home 308, including, for example, cameras, motion detectors, window/door sensors, and keypad access door locks. The surveillance devices 306 may be installed indoors or outdoors, and can each have a field of view of a particular area of home 308. As depicted in the example operating environment 300 of FIG. 3, two surveillance devices 306 are cameras 307a and 307b (e.g., surveillance camera, night-vision camera, infrared camera, or the like) that each capture video or still images of a respective area of the home 308. Each camera 307a and 307b uploads respective imaging data 320a and 320b captured of a respective scene 312a and 312b within the fields of view 310a and 310b of each of the cameras 307a and 307b. The imaging data 320a and 320b is provided to the detection model optimization system 302 over the network 301, where the detection model optimization system 302 annotates the imaging data 320a and 320b to generate respective training data 328 (e.g., as described in further detail with reference to detection model optimization system 102 with reference to FIG. 1).

In some implementations, as depicted in FIG. 3, the respective scenes 312a and 312b captured by the cameras 307a and 307b are different from one another. For example, as depicted in FIG. 3, scene 312a includes a swimming pool 314 whereas the scene 312b includes a driveway 316 of the home 308. The detection model optimization system 302 can provide a pool optimized detection model 344a to the camera 307a that is selected for a first set of performance parameters to provide optimized performance (e.g., high recall, low precision) for a scene 312a that includes a swimming pool and therefore prioritizes being notified for any perturbation of the scene given the high risk of accidents involving children or pets.

The pool optimized detection model 344a and the driveway optimized detection model 344b can be different detection models, where each is trained with a different set of training data generated from respective imaging data 320a and 320b for the respective scenes 312a and 312b captured by each camera 307a and 307b. Additionally, each of the pool optimized detection model 344a and driveway optimized detection model 344b can be selected based on different sets of performance parameters, for example, depending on the particular scenes and needs of each camera 307a and 307b. For example, the detection model optimization system 302 can provide a driveway optimized detection model 344b to the camera 307b that is selected for a second set of performance parameters to provide optimized performance (e.g., high precision, low recall) for a scene 312b that includes a driveway and therefore may prioritize identifying the vehicles/subjects in the driveway accurately over missing detection events.

In some implementations, the detection model optimization system 302 trains computationally simple models for day-time operation of the camera 307a (e.g., an red-green-blue (RGB) mode) and for night-time operation of the camera (e.g., an infrared (IR) mode). The detection model optimization system 302 can instruct the camera 307a to switch between the two optimized detection models when the camera's mode of operation changes (e.g., switches from RGB mode to IR mode).

In some implementations, the detection model optimization system 302 trains computationally simple detection models for clear weather conditions and one for inclement weather conditions. One or more of the sub-modules of the annotation module 126 can be invoked to periodically analyze current imaging data 320a from the camera 307a to identify a current state of the scene 312a.

In some implementations, the detection model optimization system 302 can deploy different computationally light surveillance solutions for different parts of a same scene 312a based on expected scene perturbation. For example, the surveillance solution for detecting a real moving object in the vicinity of moving tree branches can be trained with a larger training data set than a surveillance solution for detecting a same moving object against a relatively non-moving background.

In some implementations, the detection model optimization system 302 can determine where typical occlusions occur in a scene, e.g., in a yard of a home or a business location. For example, if a moving person is determined to typically disappear and then re-appear in the same area a few frames later, the detection model optimization system 302 can determine that an occlusion (e.g., a tree, telephone pole, column, etc.) is located in that region. The detection model optimization system 302 can then learn to track the moving object (e.g., human) through the "hidden" frames and recognize that the moving object will re-appear in a same general location after a number n of frames.

In some implementations, when scene perturbations are located only in some portions of the scene 312a and not others, the detection model optimization system 302 may choose to deploy different detection models in different parts of the scene. The scene awareness module can divide the scene into multiple sub-scenes, where sub-scenes can then be grouped into higher level descriptions, e.g., "usual scene for events" and "unusual scene for events" to dictate where object detection is expects versus not expected. In one example, a scene can include a driveway region and a wooded region, where the scene is divided into sub-scenes for the respective regions. Motion in a first portion of a scene (e.g., the driveway region) can be evaluated by a first surveillance solution and motion is a second portion of the scene can be evaluated by a second surveillance solution (e.g., the wooded region).

In some implementations, training computationally simple models can be performed on a cloud-based server. Training can additionally or alternatively be performed on onboard hardware resources, when resource utilizations are observed to be minimal.

Figure 4:
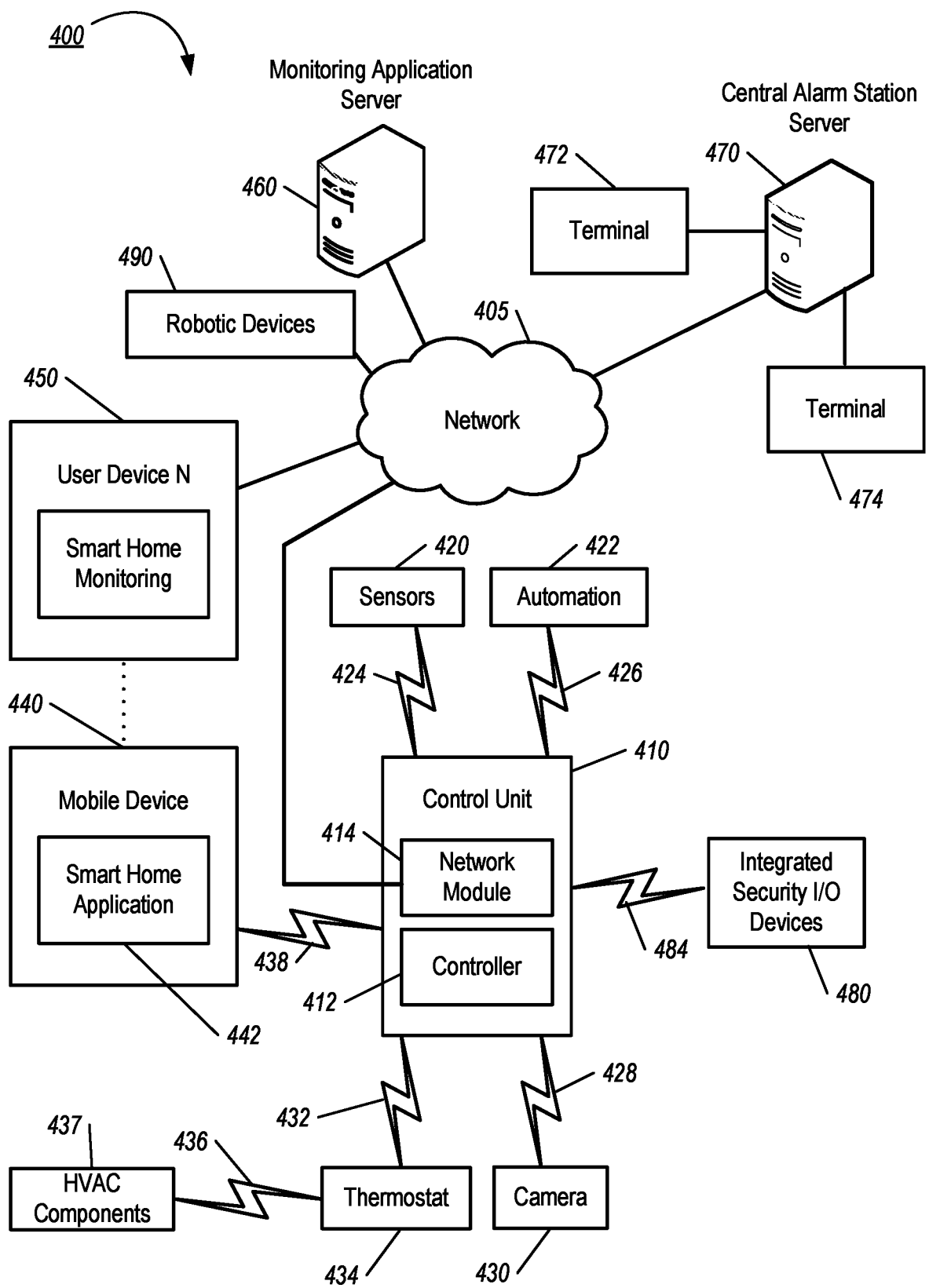
FIG. 4 shows a diagram illustrating an example home monitoring system.

FIG. 4 is a diagram illustrating an example of a home monitoring system 400 (e.g., home monitoring system 104 and home monitoring system 304). The monitoring system 400 includes a network 405, a control unit 410, one or more user devices 440 and 450 (e.g., surveillance devices 106 and surveillance devices 306), a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The monitoring system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the monitoring system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the monitoring system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the monitoring system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home.

The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The monitoring system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the monitoring system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400. For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 442. The smart home monitoring application 442 refers to a software/firmware program running on the corresponding mobile device that enables the user interface and features described throughout. The user device 440 may load or install the smart home monitoring application 442 based on data received over a network or data received from local media. The smart home monitoring application 442 runs on mobile devices platforms, such as iPhone, iPod touch, Blackberry, Google Android, Windows Mobile, etc. The smart home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the monitoring system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the monitoring system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the monitoring system 400 provides end users with access to images captured by the camera 430 to aid in decision making. The monitoring system 400 may transmit the images captured by the camera 430 over a wireless WAN network to the user devices 440 and 450. Because transmission over a wireless WAN network may be relatively expensive, the monitoring system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

Figure 5:
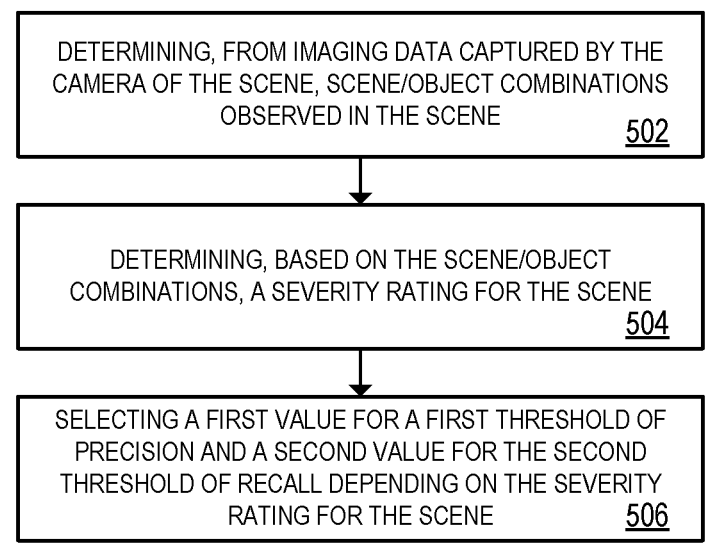
FIG. 5 is a flow diagram of an example process for selecting an optimized detection model for a camera

FIG. 5 is a flow diagram of an example process for selecting an optimized detection model for a camera. Scene/object combinations are determined from imaging data captured by the camera of the scene (502). Imaging data can be annotated with labels identifying scene characteristics, e.g., "driveway," "trees," "playground," "swimming pool," or the like. Object recognition models can be utilized to identify and label objects of interest within the scene, e.g., dog, squirrel, human, child, etc. Scene labels and typical associations of entities with the scene-labels can be accessed from pre-defined datasets to generate scene/object combinations for a particular scene. For example, a scene/object combinations can be "driveway/delivery person" or "child/swing set."

A severity rating for the scene is determined based on the scene/object combinations (504). Pre-defined datasets can be utilized to further assign a respective severity rating for each scene/object combination that is observed in the scene. Scene/object combinations with low severity ratings can be assigned low recall, high precision performance parameters 140, whereas scene/object combinations with high severity ratings can be assigned high recall, low precision performance parameters 140. For example, a dog/front yard combination can have a high severity rating (e.g., the dog is loose in the front yard) vs. a mail delivery/mailbox combination can have a low severity rating.

In some implementations, a human user can assign and/or adjust severity ratings for particular scene/object combinations or general categories of scene/object combinations. For example, a human user can assign high severity ratings to any scene/object combinations that include human objects. System 102 can additionally refine human-assigned severity ratings or severity ratings from pre-defined datasets based on, for example, scene specific details. For example, system 102 can further distinguish between human-objects within the same scene, e.g., using pattern recognition to identify frequently observed human-objects, and assign a first severity rating to a first human/scene combination, e.g., for a homeowner walking in a driveway, and a second, different severity rating to a second human/scene combination, e.g., for a delivery person walking in the driveway.

In some implementations, severity ratings for a particular scene/object combination depends in part on risk factors and/or other contextual information associated with the scene/object combinations present in the scene for the camera. Risk factors can be determined by system 102 using scene-segmentation and annotation, e.g., to identify a pool within the scene, to identify a road within the scene, or the like. For example, a child in a front yard can have a first, high risk factor, e.g., a child is unsupervised in a front yard, versus a child in a backyard can have a second, low risk factor, e.g., a child playing in a fenced yard. A same scene/object combination can have multiple severity ratings depending on a time of day, a weather condition, or the like. For example, a delivery person in a driveway can have a first, low risk factor during business hours versus a delivery person in a driveway can have a second, high risk factor in the middle of the night, e.g., indicating something wrong.

A first value for a first threshold of precision and a second value for a second threshold of recall are selected depending on the severity rating for the scene (506). In some implementations, system 102 will assign scene/object combinations with relatively high severity ratings threshold values for precision and recall to be high recall and low precision. In other words, the system 102 will assign threshold values of precision (e.g., a proportion of accurate detections) and recall (e.g., a proportion of events that are detected) based on the severity rating for the object/scene combinations.

Additionally, cloud costs (e.g., costs incurred by processing imaging data in the annotation module and training object detection models), and costs incurred per false positive detects vs false negative detections can be incorporated into the determination by system 102 of threshold values for precision and recall, e.g., from a pre-determined databased, user preferences, or available bandwidth to process detections. In some implementations, threshold values for precision and recall can be refined based on user input preferences and/or the system 102 adjustments based on real-time bandwidth availability.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:
1. A method comprising:
  receiving, by a data processing apparatus and from a camera, a first set of imaging data collected by the camera of a scene within a field of view of the camera;
  generating, by the data processing apparatus and from the first set of imaging data, annotated training data;
  training by the data processing apparatus, a plurality of detection models using the annotated training data;
  receiving, by the data processing apparatus and from the camera, a second set of imaging data capturing a current scene of the camera;
  determining, by the data processing apparatus and from the second set of imaging data captured by the camera of the current scene, a weighted set of performance parameters responsive to the current scene;
  selecting, by the data processing apparatus and based on the weighted set of performance parameters responsive to the current scene, an optimized detection model of the plurality of detection models, comprising:
    determining, from the second set of imaging data captured by the camera of the scene, scene/object combinations observed in the scene;
    determining, based on the scene/object combinations, a severity rating for the scene;
    selecting a first value for a first threshold of precision and a second value for a second threshold of recall, the first value and second value selected depending on the severity rating for the scene; and selecting, based on the first value and the second value, the optimized detection model of the plurality of detection models; and providing, by the data processing apparatus to the camera, the optimized detection model.

2. The method of claim 1, wherein annotated training data comprises one or more of subject data, event data, or scene awareness data.

3. The method of claim 2, wherein scene awareness data comprises identified exclusion zones within the scene including scene entities known to be sources of spurious motion.

4. The method of claim 2, wherein subject data comprises identified objects/humans present in the first set of imaging data collected by the camera of the scene.

5. The method of claim 2, wherein event data comprises identified locations and/or sub-areas of the scene in which events occur, and wherein identifying locations and/or sub-areas of the scene in which events occur comprises utilizing pattern recognition and clustering to analyze and extract event information from the first set of imaging data.

6. The method of claim 1, wherein each performance parameter of the weighted set of performance parameters utilized to select the optimized detection model is weighted with respect to each other performance parameter based on scene awareness, subject awareness, and event awareness.

7. The method of claim 6, wherein weights of each performance parameter in the weighted set of performance parameters depends on the first threshold of precision and the second threshold of recall for the plurality of detection models.

8. The method of claim 1, wherein the severity rating for the scene depends on risk factors associated with the scene/object combinations present in the scene for the camera.

9. The method of claim 7, wherein selecting the optimized detection model of the plurality of detection models based on the weighted set of performance parameters further comprises:

determining a first degree of complexity of the scene based on a frequency of perturbations; and selecting a particular detection model of the plurality of detection models based on a second degree of complexity of the particular detection model matching the first degree of complexity.

10. The method of claim 1, wherein two or more detection models are provided to the camera, each detection model of the two or more detection models optimized for a respective particular sub-scene of the scene, wherein each sub-scene is identified utilizing scene segmentation.

11. The method of claim 1, wherein training one or more detection models comprises utilizing a convoluted neural network to train a plurality of detection models using the annotated training data.

12. The method of claim 1, wherein generating annotated training data comprises utilizing one or more neural networks to annotate the first set of imaging data to extract information about the scene within the field of view of the camera and information related to subjects and events that are detected within the scene.

13. The method of claim 12, wherein a deep-learning classifier is utilized to differentiate between positive detections and negative detections to train a classifier what is and is not interesting in the scene.

14. A monitoring system that is configured to monitor a property, the monitoring system comprising:

a camera that is located at the property and that is configured to collect imaging data; and one or more computers and one or more storage devices storing instructions that are operable, when executed by the one or more computers, to cause the one or more computers to perform operations comprising:

receiving, from the camera, a first set of imaging data collected by the camera of a scene within a field of view of the camera;

generating, from the first set of imaging data, annotated training data;

training a plurality of detection models using the annotated training data;

receiving, from the camera, a second set of imaging data capturing a current scene of the camera;

determining, from the second set of imaging data captured by the camera of the current scene, a weighted set of performance parameters responsive to the current scene;

selecting, based on the weighted set of performance parameters responsive to the current scene, an optimized detection model of the plurality of detection models, comprising:

determining, from the second set of imaging data captured by the camera of the scene, scene/object combinations observed in the scene;

determining, based on the scene/object combinations, a severity rating for the scene;

selecting a first value for a first threshold of precision and a second value for a second threshold of recall, the first value and second value selected depending on the severity rating for the scene; and selecting, based on the first value and the second value, the optimized detection model of the plurality of detection models; and providing, to the camera, the optimized detection model.

15. The system of claim 14, wherein each performance parameter of the weighted set of performance parameters utilized to select the optimized detection model is weighted with respect to each other performance parameter based on scene awareness, subject awareness, and event awareness.

16. The system of claim 15, wherein weights of each performance parameter in the weighted set of performance parameters depends on a first threshold of precision and a second threshold of recall for the plurality of detection models.

17. The system of claim 16, wherein selecting the optimized detection model of the plurality of detection models based on the weighted set of performance parameters further comprises:

determining a first degree of complexity of the scene based on a frequency of perturbations; and selecting a particular detection model of the plurality of detection models based on a second degree of complexity of the particular detection model matching the first degree of complexity.

18. A non-transitory computer storage medium encoded with a computer program, the program comprising instructions that when executed by a data processing apparatus cause the data processing apparatus to perform operations comprising:

receiving, from a camera, first set of imaging data collected by the camera of a scene within a field of view of the camera;

generating, from the first set of imaging data, annotated training data;

training a plurality of detection models using the annotated training data;

receiving, from the camera, a second set of imaging data capturing a current scene of the camera;

determining, by the data processing apparatus and from the second set of imaging data captured by the camera of the current scene, a weighted set of performance parameters responsive to the current scene;

selecting, based on the weighted set of performance parameters responsive to the current scene, an optimized detection model of the plurality of detection models, comprising:

determining, from the second set of imaging data captured by the camera of the scene, scene/object combinations observed in the scene;

determining, based on the scene/object combinations, a severity rating for the scene;

selecting a first value for a first threshold of precision and a second value for a second threshold of recall, the first value and second value selected depending on the severity rating for the scene; and selecting, based on the first value and the second value, the optimized detection model of the plurality of detection models; and providing, to the camera, the optimized detection model.

* * * * *